United States Patent Office 3,840,499
Patented Oct. 8, 1974

3,840,499
DICARBOXYLIC ACID IMIDE COPOLYMERS
Adolph V. Di Giulio, Pittsburgh, Pa., assignor to Arco Polymers, Inc.
No Drawing. Filed Aug. 29, 1972, Ser. No. 284,683
Int. Cl. C08f 27/08; C08g 20/20
U.S. Cl. 260—78.5 T                 7 Claims

ABSTRACT OF THE DISCLOSURE

Copolymers containing 1 to 50 mole percent of an imide derivative of an ethylenically unsaturated dicarboxylic acid monomer and 99 to 50 mole percent of a non-carboxylic monomer copolymerizable therewith are prepared by the reaction of aqueous ammonia or amines with an aqueous suspension of a copolymer of the non-carboxylic monomer and an ethylenically unsaturated dicarboxylic acid, anhydride, or half acid derivative. The reaction is carried out at a temperature between 125° and 200° C. at autogenous pressure for between 3 and 48 hours. The imide products can be recovered in the form of beads or pellets, if desired.

BACKGROUND OF THE DISCLOSURE

This invention relates to the chemical conversion of dicarboxylic acid, anhydride, or half acid groups into cyclic imide groups by the reaction of aqueous ammonia or an aqueous amine solution on copolymers containing the reactive groups.

A wide variety of imide copolymers should be preparable, with modified properties and functionalities, depending on the amine utilized. By varying the substituent on the imide nitrogen, copolymers with markedly improved properties, such as heat distortion temperature, solvent resistance, flexibility, and flow characteristics, may be prepared.

Thus, the imide or N-phenylimide copolymers have higher glass transition temperatures than the corresponding dicarboxylic acid or anhydride containing copolymers, the glass temperature increasing with increasing imide content. This enhanced glass temperature is a very useful and desirable property for thermoplastic polymers.

Copolymers with imides of ethylenically unsaturated dicarboxylic acids, such as maleimide, can be prepared by direct copolymerization of the monomers. However, the imides are expensive and relatively unavailable. Although, the preparation of these copolymers by direct polymerization usually yields the 1:1 alternating copolymer, special techniques have been developed to prepare non-equimolar copolymers. Methods have been developed to convert anhydride containing copolymers to the corresponding imide copolymers by reacting the copolymers with anhydrous ammonia or with anhydrous amines in organic solvents. However, these methods involve the necessity of handling anhydrous gases or the two step process of preparing a solid half acid amide salt with subsequent cyclization of the salt to the desired imide product.

BRIEF SUMMARY OF THE INVENTION

It has now been found that copolymers containing an imide derivative of an ethylenically unsaturated dicarboxylic acid monomer can be prepared directly by reacting aqueous ammonia or amines at 125°–200° C. and under autogenous pressures of between 60 and 150 p.s.i. for 3 to 48 hours with a copolymer containing an ethylenically unsaturated dicarboxylic acid, its anhydride, or a half acid derivative of the dicarboxylic acid. The process eliminates the need for using anhydrous ammonia or amines. An advantage herein lies in the fact that many amines are normally available commercially in aqueous solution. Thus, methylamine is available as a 40% solution in water. Ammonia is commonly sold in 28–30% solution in water as ammonium hydroxide. Another advantage of the method is that it eliminates the need to prepare the imide, or N-substituted imide prior to polymerization with the other monomer.

DETAILED DESCRIPTION OF THE INVENTION

The starting copolymers for the present invention comprise any of the known copolymers of ethylenically unsaturated dicarboxylic acids, or their derivatives, with a copolymerizable monomer. The copolymerizable non-carboxylic monomers may be vinyl aryl monomers, such as styrene, alpha-methylstyrene, nuclear methylstyrenes, ethylstyrene, isopropylstyrene, tert-butylstyrene, chlorostyrenes, dichlorostyrenes, vinyl naphthalene and the like; aliphatic alphamonoolefins, such as ethylene, propylene, isobutylene, 1-butene, and 1-hexene; alkyl vinyl ethers, such as butyl vinyl ether, ethyl vinyl ether and 2-ethylhexyl vinyl ether; and conjugated diolefins, such as butadiene, isoprene, and 2,3-dimethylbutadiene. Mixtures of two or more of these copolymerizable monomers may be used if desired.

The acid moiety may be an ethylenically unsaturated dicarboxylic acid, its anhydride, or a half acid derivative of such a dicarboxylic acid or mixtures thereof. Suitable acids and their derivatives useful in the present invention are maleic acid, fumaric acid, itaconic acid, citraconic acid, mesaconic acid, ethyl maleic acid, methyl itaconic acid, chloromaleic acid, dichloromaleic acid, bromomaleic acid, dibromomaleic acid and the like, the anhydrides of these acids, the acid amide derivatives, or the half esters of these with suitable alcohols. The alcohols used may be the primary and secondary alkanols containing up to 6 carbon atoms, such as, methyl alcohol, ethyl alcohol, n-propyl alcohol, n-butyl alcohol, sec-butyl alcohol, and n-pentyl alcohol; halogenated alkanols having up to 6 carbon atoms, such as 2,3-dichloro-1-propanol, and 2-bromo-1-propanol; arylalkyl alcohols, such as benzyl alcohol; cyclic alcohols having up to 6 carbon atoms, such as cyclopentanol, cyclohexanol and tetrahydrofurfuryl alcohol; ether alcohols, such as 2-butoxyethanol and the ethyl ether of diethylene glycol, and the like.

The starting copolymers may be either the alternating copolymers containing ratios of acid monomer to non-acid monomer of about 1:1, or the non-equimolar copolymers containing less than about 50 mole percent of the acid monomer.

The non-equimolar copolymers are comprised of a major amount, that is greater than about 50 mole percent, of the non-acid monomer and a minor amount, that is less than 50 mole percent, of an ethlenically unsaturated dicarboxylic acid moiety.

Non-equimolar starting copolymers may be prepared by any of the several methods available for the preparation of non-equimolar copolymers. Thus, these copolymers may be prepared by solution polymerization directly from the respective monomers by the incremental addition of the reactive monomer as taught by U.S. Pat. 2,971,939; by a continuous recycle polymerization process such as described in U.S. Pats. 2,769,804 and 1,989,517; or by the suspension polymerization process described in my U.S. Pat. 3,509,110.

The copolymers of the present invention are prepared by reacting the starting copolymers with aqueous ammonia or amines. Suitable amines are the alkyl amines having 1 to 4 carbon atoms, such as methylamine, ethylamine, propylamine, isopropylamine and butylamine; ethanolamine; aniline, benzylamine; allylamine and the like.

Also suitable are the water soluble α,ω-alkylenediamines having 2 to 6 carbon atoms in the alkylene group, such as ethylenediamine, and hexamethylenediamine. Arylene diamines, such as the phenylenediamines and benzidines may also be used. The diamines are useful for preparing copolymers having varying degrees of cross-linking. These diamines may be used alone or in combination with other monoamines to vary the degree of cross-linking.

The ammonia or amines may be used in stoichiometric amounts based on the dicarboxylic acid moiety in the copolymer. However, it is preferred to use an excess of the stoichiometric amount to ensure complete conversion of the dicarboxylic acid moiety to the desired imide or N-substituted imide. Use of less than stoichiometric amounts of the amine make it possible to prepare terpolymers containing both the uncyclized dicarboxylic acid function and the imide function. Further heating in the open will completely cyclize the acid function to form the terpolymer containing the anhydride and the imide groups.

The reaction is preferably carried out at temperatures of between 125° C. and 200° C. At temperatures below 125° C., for example 80–100° C., the product upon separation contains uncyclized species which when heated more strongly cyclize to both the anhydride and the desired imide moiety. If bead product is desired, the upper limit of temperature will vary depending on the dicarboxylic functionality content of the copolymer. The lower the functionality (anhydride, half acid, or imide) content, the greater the tendency for agglomeration at a given temperature. Further, the use of a suspending agent, such as for example polyvinyl alcohol, during the heating, will raise the temperature which can be reached without agglomeration. Thus, a copolymer containing about 7 mole percent imide, heated without the use of a suspending agent, might agglomerate at 140°–145° C. However, the use of polyvinyl alcohol as suspending agent will effectively raise the temperature attainable without agglomeration to about 160° C.

The reaction is carried out at autogenous pressure. The pressures reached will normally vary between 60 and 150 p.s.i. depending on the concentration and volatility of the particular amine being used and the temperature of the reaction. If carried out at atmospheric pressure, the product of the reaction of aqueous amines with the dicarboxylic acid moiety can be shown to be the amine salt of the carboxylic acid or perhaps the carboxamic acid derivatives. The reaction must therefore be effected in a closed system but the pressure will vary with the reaction system employed.

The reaction may be carried out for times varying between about 3 and 48 hours depending upon the degree of conversion of the dicarboxylic acid moiety desired, upon the temperature employed, upon the type and concentration of reagents used, and upon the physical form of the starting copolymer. Thus, if small particle size beads are used, the time of reaction may be less than if larger pellets are utilized. Higher temperatures of reaction allow shorter times of reaction for any particular system of reactants. Shorter times also may be used if one wishes to prepare an interpolymer containing the non-functional monomer, the anhydride, the imide, and uncyclized dicarboxylic functionality. These interpolymers can be completely cyclized to terpolymers of the non-functional monomer, anhydride, and imide if so desired. The cyclization may be easily carried out by heating the product containing the uncyclized moieties to a temperature of 200°–225° C., for 0.5–1.0 hour preferably under vacuum. Longer times may be used if desired. Much shorter times are needed if the heating is done in a devolatilizing extruder.

The desired product may be recovered by any of the known methods of separating solids from a liquid medium. These include filtration, decantation and centrifugation. The product so separated is then washed with water to remove impurities, and dried in air, or preferably in a circulating oven at about 50–80° C. for 24–48 hours. The temperature useful in this drying step may be higher if desired, depending on the particular copolymers to be dried. Since the imide containing copolymers have higher transition temperatures than the corresponding anhydride containing copolymers, higher temperatures of drying can be used without causing the beads of copolymer to melt and fuse together.

The products are desirable and useful polymers because of their enhanced glass transition temperatures. Thus, polystyrene has a glass temperature of 100° C. A copolymer of styrene and 10 mole-percent N-methylmaleimide has a glass temperature of 122° C. and a copolymer of styrene and 9 mole-percent maleimide has a glass temperature of 133° C. Increasing the maleimide content of a styrene copolymer to 18.1 mole-percent raised the glass temperature to 151° C. Similarly, a copolymer of styrene with 7 mole-percent N-n-butylmaleimide has a Tg of 108° C., and one containing 7 mole-percent N-(betahydroxyethyl) maleimide has a $T_g$ of 114° C. Copolymers of styrene with the imide comonomers, such as maleimide, itaconimide, etc., also are useful as chemically reactive intermediates. The imide group can be further reacted with, for example, formaldehyde to give an N-methylol derivative useful for further reaction, such as crosslinking by condensation with bisphenols, diisocyanates and the like. These and other reactions dependent upon the reactive hydrogen on the imide group can be utilized in many ways by one skilled in the art.

Although the present invention relates primarily to copolymers containing dicarboxylic acids or their derivatives, it should be obvious to one skilled in the art that the reaction could be applicable to copolymers containing monocarboxylic acids in close enough spatial configuration so that cyclic imides having 5–8 membered rings could be formed. Examples of such copolymers are those containing acrylic acid, methacrylic acid, crotonic acid, or cinnamic acid wherein two or more carboxyl containing monomers are in close proximity to each other.

The following examples are given to illustrate further the invention but are not intended to be all inclusive.

Example I

To a 1 liter bench type Parr autoclave was added 10 g. of pellets of a copolymer of styrene and maleic anhydride containing 10.9 mole percent anhydride, 390 ml. water, and 60 ml. of a 28–30% aqueous ammonium hydroxide solution. The reactor was closed and heated to 139–147° C. for about 12 hours during which time the pressure varied between 63 and 86 p.s.i. The reactor was cooled down, the pressure released, and the polymer pellets separated from the aqueous layer by filtration. The pellets were washed with water, and dried in air at room temperature. The product was in the form of opaque pellets, which analyzed by infrared to have about 2.0 mole percent maleic anhydride groups and 8.9 mole percent maleimide groups. The glass transition temperature measured by differential thermal analysis was 129° C. on the crude pellets and 132° C. on polymer reprecipitated by methanol from methyl ethyl ketone and dried at about 38° C. Further heating of the crude pellets at 230° C. for 0.5–1.0 hour did not cause any change in the anhydride or imide content of the polymer. Thus, it may be seen that the treatment of the anhydride copolymer with aqueous ammonia gave directly, the desired imide copolymer.

Example II

To a 12 ounce glass bottle was added 80 g. of a styrene-maleic anhydride copolymer pellets containing 10.9 mole percent of anhydride, 142 ml. water, 1.33 ml. of 5% polyvinyl alcohol solution in water, and 36.3 ml. of 40% aqueous solution of methylamine. The bottle was sealed, heated to a temperature of 137° C. for about 12.5 hours. On cooling the product was recovered in the form of opaque pellets which analyzed by infrared as having about 1.0 mole percent anhydride and 9.9 mole percent N-methylmaleimide groups. The terpolymer had a glass transition temperature of 122° C. as measured by differential thermal analysis. The product was then fused at 200° C. under 1 mm. pressure for 3 hours to remove traces of moisture and to complete cyclization of possibly uncyclized species. Examination of the infrared spectra of the unfused and fused products showed them to be essentially identical.

Example III

To each of series of 12 ounce bottles was added 80 g. of styrenemaleic anhydride copolymer containing the mole percent of maleic anhydride indicated in the Table 1, water and ammonium hydroxide as indicated, and 1.6 ml. of 5% aqueous polyvinyl alcohol solution. The bottles were capped and raised to the temperature indicated in the table for the length of time indicated. In all cases, after the product had been separated from the water and dried in air at 60° C. for about 24 hours, the copolymers were found to have been converted essentially quantitatively to the styrene-malemide copolymers.

TABLE I

| Bottle No. | Maleic anhydride content mole percent | NH₄OH 28-30% NH₃ (ml.) | Water (ml.) | Temp. (° C.) | Time (hrs.) |
|---|---|---|---|---|---|
| 1 | 2.0 | 9.6 | 168.7 | 140 | 12 |
| 2 | 6.4 | 28.8 | 149.5 | 136-8 | 12 |
| 3 | 10.6 | 28.8 | 149.5 | 140 | 12 |
| 4 | 18.1 | 28.8 | 149.5 | 140-4 | 14 |
| 5 | 18.1 | 48.0 | 130.3 | 136-8 | 12 |
| 6 | 33.0 | *18.0 | *50.0 | 140 | 12 |

*With 15 g. of copolymer instead of 80 g.

The sample from bottle No. 5 which contained 18.1 mole percent maleimide had a glass temperature, $T_g$, measured by differential thermal analysis of 151° C., compared to a styrene-maleic anhydride copolymer containing 18.1 mole percent anhydride which had a $T_g$ of 128° C.

Example IV

To illustrate the effect of temperature of reaction upon the cyclization reaction, several experiments were conducted in sealed glass tubes. Three different copolymers were used as follows:

Copolymer A was a styrene-methyl hydrogen maleate copolymer containing 4.1 mole-percent maleate; copolymer B was a styrene n-butyl hydrogen maleate copolymer containing 7.2 mole-percent maleate; and copolymer C was a styrene-maleic acid-maleic anhydride terpolymer containing 4.7 mole-percent acid and 3.1 mole-percent anhydride. The copolymers in bead form, the amine, and water were sealed in the glass tubes and heated to varying temperatures for varying times. The products were then separated from the water, dried and heated at 225° C. for 40–60 minutes to ensure complete cyclization of the products. The results are given in Table II.

As may be seen from run numbers 1 and 6, a temperature of from 80 to 100° C. gave predominantly the anhydride product rather than the desired imide. As between the 130° C. temperature and the 150° C. temperature, little difference could be seen when using butylamine, methylamine, or ethanolamine, but the higher temperature with aqueous ammonia gave greater percentages of the desired imide than obtained at 130° C. as shown by comparing run 7 with run 11 and 13 with run 17.

Infrared data on samples from runs 2–5, 7–10, and 13–16 prior to the final heating at 225° C., indicated that the products made at 130° contained some uncyclized derivatives of the imides. The heating step then completed the cyclization to the desired imide structures. Similar analysis of the products of runs 11, 12 and 17–20 indicated that the products made at 150° C. were essentially all cyclized even prior to the final heating tep.

Example V

To each of two 1 liter Parr bench type autoclaves added 25 g. of a styrene-n-butyl hydrogen maleate copolymer containing 7.2 mole-percent maleate in bead form, 400 ml. water and 43.3 g. of 40% aqueous methylamine solution. One of the autoclaves was heated to 146-9° C. for 3–4 hours at a pressure of 75 p.s.i. The product was in the form of beads and contained substantial amounts of imide and some uncyclized moieties. This product, when heated at 225° C. for 45 minutes was completely cyclized and analyzed at 6.2 mole-percent N-methylmaleimide and about 1.0 mole-percent maleic anhydride.

The other autoclave was heated to 146–157° C. for 16 hours at a pressure of 90–100 p.s.i. The product was agglomerated but contained only the desired N-methylmaleimide structure, with no need for further heating. The agglomeration of the beads was probably due to the fact that the system was heated above the softening point of the polymer beads.

Example VI

To a 3 liter resin kettle equipped with stirrer, thermometer, reflux condenser and a nitrogen atmosphere was added 1700 ml. of deionized water, 20 ml. of 5% polyvinyl alcohol solution and 145 ml. of aniline. The mixture was heated to reflux temperature and 400 g. of styrene-maleic anhydride copolymer pellets containing 18.1 mole percent maleic anhydride and 21 ml. additional polyvinyl alcohol solution were added. The stirred mixture was refluxed for 45 minutes. Then 45 ml. of aniline was added over 24 minutes, and the stirred mixture refluxed an additional 45 minutes. An additional 362 g. of thhe copolymer and 14 ml. of aniline were added over 20 minutes and the entire mixture was refluxed for 80 minutes and the mixture cooled. The purpose of this preliminary pro-

TABLE II

| Run No. | Copolymer (g.) | Amine (ml.) | Water (ml.) | Temp. (° C.) | Times (hours) | Product after cyclization (mole percent) Anhydride | Imide |
|---|---|---|---|---|---|---|---|
| 1 | A (10.0) | 28-30% NH₃, NH₄OH (50) | 50 | 80-100 | 8 | 3.6 | 0.5 |
| 2 | A (1.0) | 28-30% NH₃, NH₄OH (15) | | 130 | 24 | 0.5 | 3.6 |
| 3 | A (1.0) | n-Butylamine (7) | 8 | 130 | 13 | 0.5 | 3.6 |
| 4 | A (1.0) | Ethanolamine (7) | 8 | 130 | 13 | 0.5 | 3.6 |
| 5 | A (1.0) | 40% aq. methylamine (15) | | 130 | 24 | 0.1 | 4.0 |
| 6 | C (10.0) | 28-30% NH₃, NH₄OH (100) | | 80-100 | 8 | 6.0 | 1.8 |
| 7 | C (1.0) | 28-30% NH₃, NH₄OH (15) | | 130 | 24 | 2.9 | 4.9 |
| 8 | C (1.0) | n-Butylamine (7) | 8 | 130 | 38 | 0.3 | 7.5 |
| 9 | C (1.0) | Ethanolamine (7) | 8 | 130 | 38 | 0.3 | 7.5 |
| 10 | C (1.0) | 40% aq. methylamine (15) | | 130 | 24 | 1.6 | 6.2 |
| 11 | C (1.0) | 28-30% NH₃, NH₄OH (15) | | 150 | 24 | 1.6 | 6.2 |
| 12 | C (1.0) | 40% aq. methylamine (15) | | 150 | 24 | 1.6 | 6.2 |
| 13 | B (1.0) | 28-30% NH₃, NH₄OH (15) | | 130 | 24 | 2.7 | 4.5 |
| 14 | B (1.0) | n-Butylamine (7) | 8 | 130 | 24 | 0.5 | 6.7 |
| 15 | B (1.0) | Ethanolamine (7) | 8 | 130 | 24 | 0.5 | 6.7 |
| 16 | B (1.0) | 40% aq. methylamine (15) | | 130 | 24 | 2.0 | 5.2 |
| 17 | B (1.0) | 28-30% NH₃, NH₄OH (15) | | 150 | 24 | 1.6 | 5.6 |
| 18 | B (1.0) | 40% aq. methylamine (15) | | 150 | 24 | 0.5 | 6.7 |
| 19 | B (1.0) | n-Butylamine (7) | 8 | 150 | 24 | 0.5 | 6.7 |
| 20 | B (1.0) | Ethanolamine (7) | 8 | 150 | 24 | 0.5 | 6.7 | cedure was ensure intimate mixing of the copolymer and the aniline without agglomeration of the copolymer pellets.

The mixture was then transferred to 12 oz. bottles, each bottle containing approximately 80 g. of wet pellets and about 125–135 g. of liquid. The bottles were purged with nitrogen, capped, and heated at 140° C. for 12 hours while rotating in an oil bath. The discrete opaque pellets were filtered, washed and dried. A portion of these pellets was analyzed by infrared and by non-aqueous titration with sodium methoxide solution. The infrared analysis showed the product to be predominantly styrene-N-phenylmaleimide, with a small amount of unreacted anhydride and some acidic species. After heating at 215° C. under vacuum, the product was shown to contain 15.9 mole percent N-phenylmaleimide and 2.2 mole percent of maleic anhydride moieties in the copolymer.

A second lot of pellets, about 80 g. was added to a bottle containing 165 ml. of water, 8 ml. of aniline, and 4 ml. of polyvinyl alcohol solution, capped, and heated for an additional 12 hours at 140° C. Analysis of this product by infrared and by titration showed that essentially all of the remaining anhydride moieties had been converted to the N-phenylmaleimide derivative. Analysis of this product, and a sample heated at 215° C. under vacuum, showed both products to be essentially identical, each containing 0.5 mole percent of anhydride and 17.6 mole percent N-phenylmaleimide moieties.

Example VII

A sealed 12 oz. bottle containing 80 g. of a styrene-maleic anhydride copolymer pellets having 18.1 mole percent anhydride, 142 ml. water, 1.67 ml. of 5% aqueous polyvinyl alcohol solution, and 18.5 ml. allylamine was heated at 140° C. for 12 hours. The product was analyzed by infrared and by non-aqueous titration and found to be a copolymer of styrene with 0.2 mole percent maleic anhydride and 17.9 mole percent N-allylmaleimide. This copolymer had a $T_g$ of 123° C. compared to 128° C. for the starting anhydride copolymer.

Example VIII

To illustrate the use of diamines, a sealed 12 oz. bottle containing 40 g. of styrene-maleic anhydride copolymer having 20.6 mole percent anhydride, 75 ml. of water, 1.0 ml. of 5% aqueous polyvinyl alcohol solution and 5.0 g. of ethylene diamine was heated at 140° C. for about 12 hours. The resulting discrete pellets were washed and dried, and then they were digested in chloroform. Analysis of the product showed that 25% of the product was insoluble, crosslinked polymer, while 75% remained as soluble, un-crosslinked polymer.

Similar experiments with varying concentrations of benzidine or hexamethylenediamine gave partially insoluble products. Often the pellets were crosslinked on the surface, since treatment with a solvent for the initial anhydride copolymer, such as methyl ethyl ketone, gave hollhow particles of insoluble polymer. The amount of crosslinking obtained can be controlled either by increasing the diamine concentration or by changing the reaction time, or both. The amount of cross-linking obtained is also dependent upon the particle size and shape of the initial copolymer; the smaller particles giving greater crosslinking.

What is claimed is:

1. A process for preparing a copolymer in bead form containing from 1 to 50 mole percent of an imide derivative of an ethylenically unsaturated dicarboxylic acid and 99 to 50 mole percent of a non-carboxylic monomer copolymerizable therewith comprising:
    a. forming an aqeuous suspension of (1) a copolymer in bead form containing 1 to 50 mole percent of a dicarboxylic moiety and 99 to 50 mole percent of a non-carboxylic monomer copolymerizable therewith and (2) aqueous ammonia or an aqueous amine in an amount sufficient to reach stoichiometrically with the dicarboxylic moiety;
    b. heating said suspension with agitation in a closed system at a temperature of between 125 and 200° C. at autogenous pressure for 3 to 48 hours to allow reaction between the ammonia or amine and the dicarboxylic moiety; and
    c. separating the copolymer in bead form from the aqueous medium.

2. The process of Claim 1 wherein the dicarboxylic moiety is selected from the group consisting of an ethylenically unsaturated dicarboxylic acid, an ethylenically unsaturated dicarboxylic anhydride, with an ethylenically unsaturated dicarboxylic acid half acid derivative, and mixtures thereof.

3. The process of Claim 1 wherein the non-carboxylic monomer is selected from the group consisting of a vinyl aryl monomer, an aliphatic alpha-monoolefin, an alkyl vinyl ether, a conjugated diolefin, and mixtures thereof.

4. The process of Claim 1 wherein the aqueous amine is an amine selected from the group consisting of alkyl amines having 1 to 4 carbon atoms in the alkyl group, allyl amine, ethanolamine, aniline, benzylamine, α,ω-alkylene diamines having 2 to 6 carbon atoms in the alkylene group, and arylene diamines.

5. A process for preparing a non-equimolar copolymer in bead form containing a major amount of vinyl aryl monomer and a minor amount of an imide derivative of an ethylenically unsaturated dicarboxylic acid monomer comprising:
    a. forming an aqueous suspension of (1) a copolymer in bead form containing a major amount of said vinyl aryl monomer and a minor amount of a monomer selected from the group consisting of an ethylenically unsaturated dicarboxylic acid, an ethylenically unsaturated dicarboxylic anhydride, and an ethylenically unsaturated dicarboxylic acid half acid derivative and mixtures thereof and (2) aqueous ammonia or an aqueous amine;
    b. heating said suspension with agitation in a closed system at a temperature of between 125 and 200° C. at autogenous pressure for 3 to 48 hours; and
    c. separating the copolymer in bead form from the aqueous medium.

6. The process of Claim 5 wherein said aqueous amine is an amine selected from the group consisting of alkyl amines having 1 to 4 carbon atoms in the alkyl group, allyl amine, ethanolamine, aniline, benzylamine, α,ω-alkylenediamines having 2 to 6 carbon atoms in the alkylene group, and arylene diamines.

7. The process of Claim 5 wherein said copolymer is selected from the group consisting of styrene-maleic anhydride, styrene-methyl acid maleate, styrene-n-butyl acid maleate, styrene-maleic acid-maleic anhydride, and styrene-butadiene-maleic anhydride.

References Cited

UNITED STATES PATENTS

| | | | |
|---|---|---|---|
| 3,520,852 | 7/1970 | Pratt et al. | 260—78 |
| 3,632,797 | 1/1972 | Boardman | 260—78 U A |
| 3,506,625 | 4/1970 | Patinkin et al. | 260—78.5 |
| 3,488,329 | 1/1970 | Johnson | 260—78.5 |

JOSEPH L. SCHOFER, Primary Examiner

J. KIGHT, Assistant Examiner

U.S. Cl. X.R.

260—78 UA, SC, 80 BN, 96 R

PO-1050
(5/69)

UNITED STATES PATENT OFFICE
CERTIFICATE OF CORRECTION

Patent No. 3,840,499　　　　　　　　Dated　October 8, 1974

Inventor(s)　Adolph V. DiGiulio

It is certified that error appears in the above-identified patent and that said Letters Patent are hereby corrected as shown below:

In Claim 1, column 8, line 3 change "reach" to read --react--.

Signed and sealed this 10th day of December 1974.

(SEAL)
Attest:

McCOY M. GIBSON JR.　　　　　　C. MARSHALL DANN
Attesting Officer　　　　　　　Commissioner of Patents